(12) United States Patent
Hart

(10) Patent No.: US 8,737,623 B2
(45) Date of Patent: May 27, 2014

(54) SYSTEMS AND METHODS FOR REMOTELY LOADING ENCRYPTION KEYS IN A CARD READER SYSTEMS

(75) Inventor: Annmarie D. Hart, Seal Beach, CA (US)

(73) Assignee: Magtek, Inc., Seal Beach, CA (US)

( * ) Notice: Subject to any disclaimer, the term of this patent is extended or adjusted under 35 U.S.C. 154(b) by 105 days.

(21) Appl. No.: 13/231,819

(22) Filed: Sep. 13, 2011

(65) Prior Publication Data
US 2012/0063601 A1    Mar. 15, 2012

Related U.S. Application Data

(60) Provisional application No. 61/382,436, filed on Sep. 13, 2010.

(51) Int. Cl.
| | | |
|---|---|---|
| H04L 9/08 | (2006.01) | |
| H04L 9/00 | (2006.01) | |
| H04L 29/06 | (2006.01) | |
| H04L 9/32 | (2006.01) | |

(52) U.S. Cl.
USPC ........... 380/279; 380/270; 713/159; 713/169; 713/172; 713/176; 713/185; 713/186; 726/2; 726/12

(58) Field of Classification Search
USPC ................. 713/159, 185, 186, 172, 169, 176; 380/270, 279; 726/2, 12
See application file for complete search history.

(56) References Cited

U.S. PATENT DOCUMENTS

| | | | |
|---|---|---|---|
| 6,075,860 A * | 6/2000 | Ketcham ..................... 713/159 | |
| 6,098,881 A | 8/2000 | DeLand, Jr. et al. | |
| 6,606,387 B1 | 8/2003 | Abraham | |
| 6,684,334 B1 | 1/2004 | Abraham | |
| 7,079,007 B2 * | 7/2006 | Siegel et al. ................. 340/5.52 | |
| 7,210,627 B2 | 5/2007 | Morley, Jr. et al. | |
| 7,377,433 B2 | 5/2008 | Morley, Jr. et al. | |
| 7,478,751 B2 | 1/2009 | Morley, Jr. et al. | |
| 7,673,799 B2 | 3/2010 | Hart et al. | |
| 7,908,474 B2 * | 3/2011 | Arnold et al. ................. 713/155 | |
| 7,983,994 B2 * | 7/2011 | Hurry ............................. 705/72 | |
| 2005/0167496 A1 * | 8/2005 | Morley et al. ................. 235/449 | |

(Continued)

OTHER PUBLICATIONS

Hamza et al. "A Dynamic ID-based authentication scheme with smart token." IEEE: 2009, pp. 294-299.*

(Continued)

Primary Examiner — Luu Pham
Assistant Examiner — Kari Schmidt
(74) Attorney, Agent, or Firm — Loza & Loza, LLP; Gabriel Fitch

(57) ABSTRACT

Systems and methods for remotely loading encryption keys in card reader systems are provided. One such method includes storing, at a card reader, a device identification number for identifying the card reader, a first magnetic fingerprint of a data card, and a second magnetic fingerprint of the data card, wherein each of the first and second fingerprints includes an intrinsic magnetic characteristic of the data card, encrypting, using a first encryption key derived from the second fingerprint, information including the device identification number and first fingerprint, sending the encrypted information to an authentication server, receiving, from the authentication server, a score indicative of a degree of correlation between the first fingerprint and second fingerprint, and receiving, when the score is above a preselected threshold, a second encryption key from the authentication server, the second encryption key encrypted using a third encryption key derived from the first fingerprint.

26 Claims, 7 Drawing Sheets

(56) References Cited

U.S. PATENT DOCUMENTS

| | | | |
|---|---|---|---|
| 2005/0173530 A1* | 8/2005 | DeLand et al. | 235/449 |
| 2008/0179401 A1* | 7/2008 | Hart et al. | 235/449 |
| 2008/0208758 A1 | 8/2008 | Spiker et al. | |
| 2008/0215887 A1 | 9/2008 | Hart et al. | |
| 2010/0031021 A1 | 2/2010 | Arnold et al. | |
| 2010/0189263 A1* | 7/2010 | Cunningham et al. | 380/279 |
| 2011/0228941 A1* | 9/2011 | Shoarinejad et al. | 380/270 |

OTHER PUBLICATIONS

Liou et al. "On Improving Feasibility and Security Measures of Online AUthentication", International Journal of Advancements in Computing Technology vol. 2, No. 4, Oct. 2010.*

\* cited by examiner

SYSTEMS AND METHODS FOR REMOTELY LOADING ENCRYPTION KEYS IN A CARD READER SYSTEMS

CROSS-REFERENCE TO RELATED APPLICATION(S)

The present application claims priority to and the benefit of Provisional Application No. 61/382,436, filed Sep. 13, 2010, entitled "SYSTEMS AND METHODS FOR REMOTELY LOADING ENCRYPTION KEYS IN CARD READER SYSTEMS", the entire content of which is incorporated herein by reference.

FIELD

The present invention relates generally to card reader systems, and more specifically to systems and methods for remotely loading encryption keys in card reader systems.

BACKGROUND

Automated Teller Machines (ATMs), PIN entry devices, and point of sale (POS) terminals have become central features of modern life and are prevalent in a number of environments. For example, during the course of a day, a user may utilize an ATM to conduct financial transactions, purchase gas from a point of sale terminal in the form of a fuel pump via a credit or debit card, and purchase food at the grocery store with a point of sale terminal also with a credit or debit card. In all of these instances, security is a prime concern, and an individual's data (card number, passwords, account numbers, etc.) should be kept secure and out of reach from unintended parties. In addition, access to controls and machine settings should be secured. The securing of sensitive data is normally accomplished through the use of encryption or encoding of the data. Encrypted data is supposed to be accessible only by an intended party with use of one or more encryption keys to decipher the encoded information. The widespread use of electronic transaction processing applications has increased the demands for improved features, ease of use, and improved security.

Remote Key Loading refers to the process of loading symmetric encryption keys to a remotely located device, such as an ATM, from a central administrative site. This process generally encompasses two phases of key distribution. The first phase includes distribution of initial key encrypting keys (KEKs) to a newly installed device. A KEK is a type of symmetric encryption key that is used to encrypt other keys so they can be securely transmitted over unprotected paths. The second phase includes distribution of operational keys or replacement KEKs, enciphered under a KEK currently installed in the device.

A new ATM or POS device, when it is delivered from the manufacturer and being put into operation, generally has none of the affiliated bank's or service provider's security keys pre-installed. The process of getting the first key securely loaded in the ATM or POS device is a difficult one. Loading the first KEK into each ATM or POS device manually, in multiple clear text key parts has typically been the preferred manner for performing a secure key loading process. In this process, two separate people carry key part values to the ATM, and load them manually. Once inside the ATM or POS device, they are combined to form the actual KEK. In this manner, neither of the two people has the entire key, protecting the key value from disclosure or misuse. This method is labor-intensive and error-prone, making it expensive for the banks or service providers.

Conventional methods for remote key loading have used public key infrastructure (PKI), or asymmetric cryptography, to load encryption keys into remotely located devices. However, the infrastructure of both hardware and software necessary to provide PKI remote key loading can be complex and expensive. In addition, traditional PKI systems typically require establishment of a trusted third party for issuing digital certificates that bind a public key with other preselected information for verification purposes. Accordingly, systems and methods for remote key loading that are less complex and expensive than PKI would be beneficial.

SUMMARY

Aspects of the invention relate to systems and methods for remotely loading encryption keys in card reader systems. In one embodiment, the invention relates to a method for remotely loading encryption keys into a card reader system, the method including storing, at a card reader, a device identification number for identifying the card reader, a first magnetic fingerprint of a data card, and a second magnetic fingerprint of the data card, wherein each of the first and second magnetic fingerprints includes an intrinsic magnetic characteristic of the data card, encrypting, using a first encryption key derived from the second magnetic fingerprint, information including the device identification number and the first magnetic fingerprint, sending the encrypted information to an authentication server, receiving, from the authentication server, a score indicative of a degree of correlation between the first magnetic fingerprint and the second magnetic fingerprint, and receiving, when the score is above a preselected threshold, a second encryption key from the authentication server, the second encryption key encrypted using a third encryption key derived from the first magnetic fingerprint.

In another embodiment, the invention relates to a system for remotely loading encryption keys, the system including a card reader system including a card reader, and an authentication server in communication with the card reader system, the card reader system configured to store a device identification number for identifying the card reader, a first magnetic fingerprint of a data card, and a second magnetic fingerprint of the data card, wherein each of the first and second magnetic fingerprints includes an intrinsic magnetic characteristic of the data card encrypt, using a first encryption key derived from the second magnetic fingerprint, information including the device identification number and the first magnetic fingerprint, send the encrypted information to the authentication server, receive, from the authentication server, a score indicative of a degree of correlation between the first magnetic fingerprint and the second magnetic fingerprint, and receive, when the score is above a preselected threshold, a second encryption key from the authentication server, the second encryption key encrypted using a third encryption key derived from the first magnetic fingerprint.

DETAILED DESCRIPTION

Figure 1:
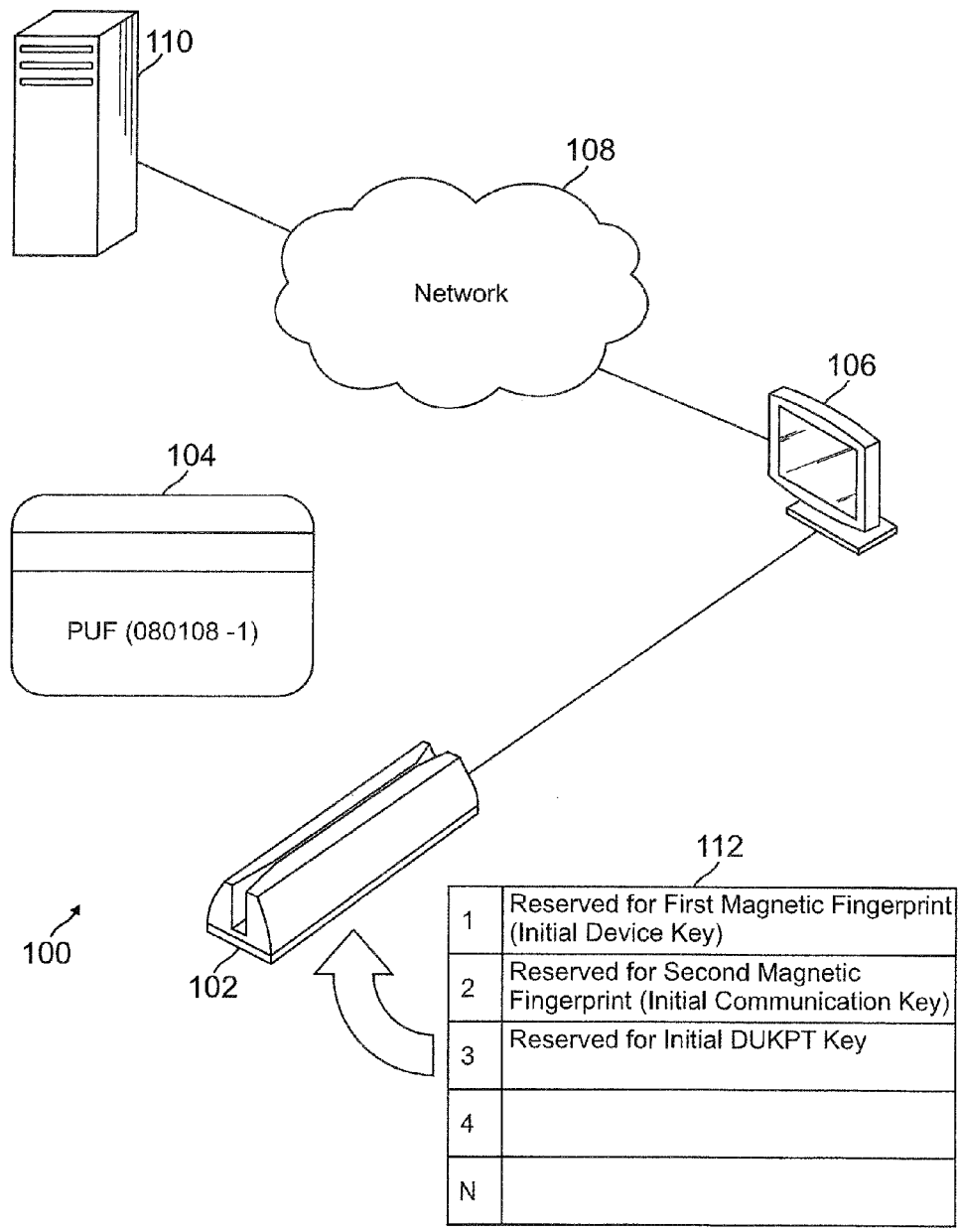
FIG. 1 is a schematic block diagram of a system, including a card reader and a magnetic seed card, for performing initial (manufacturing) key seeding in accordance with one embodiment of the present invention.

Referring now to the drawings, embodiments of methods for remotely loading encryption keys include storing successive readings of magnetic fingerprints of a magnetic seed card within a card reader during manufacturing, sending at least one of the magnetic fingerprints and a device identification number of the card reader to an authentication server for storage, authenticating the card reader in the field using the stored magnetic fingerprints and the device identification number, sending a new encryption key (remote key) to the card reader encrypted using one of the stored magnetic fingerprints. In such case, the method can effectively remotely load a new encryption key using one of the seeded magnetic fingerprints as an encryption key and/or another of the seeded magnetic fingerprints for device authentication.

In a number of embodiments, the methods for remotely loading encryption keys include use of one or more magnetic fingerprints for both authenticating a device and for acting as a key encryption key for loading an encryption key to be used for processing transactions. In several embodiments, a portion of the magnetic fingerprint is used as the key encryption key. In many embodiments, the magnetic fingerprint provided from the magnetic medium of the magnetic seed card includes random and unique characteristics that are well suited for use in both authentication and encryption key generation. In several embodiments, the methods for remotely loading encryption keys can be analogous to various PKI systems without the overhead associated with initial key generation and establishing a trusted third party.

FIG. 1 is a schematic block diagram of a system 100, including a card reader 102 and a magnetic seed card 104, for performing initial (manufacturing) key seeding in accordance with one embodiment of the present invention. In addition to the card reader 102 and the magnetic seed card 104, the system 100 further includes a computer 106 for executing programming instructions for seeding the card reader 102, a network 108, and an authentication server 110. The seeding computer 106 is coupled to the card reader 102 and to the authentication server 110 via the network 108. The card reader 102 includes a non-volatile memory 112, a portion of which can be referred to as a key slot, for storing encryption keys and magnetic fingerprints of the seed card 104 that can be used as encryption keys. The key slots include first key slot 112-1, second key slot 112-2 up to last key slot 112-N.

In operation, the magnetic seed card 104 can be swiped through the card reader 102. Based on the information obtained from the magnetic stripe of the seed card 104, the card reader 102 can generate a first magnetic fingerprint and store it in the first key slot 112-1. The first magnetic fingerprint can be a value indicative of an intrinsic magnetic characteristic of the seed card 104. In several embodiments, the intrinsic magnetic characteristic includes a remanent noise characteristic unique to the magnetic stripe of the seed card 104. Systems and methods for reading data cards and generating magnetic fingerprints therefrom are described in U.S. Pat. No. 6,098,881 to Deland, Jr., et al., U.S. Pat. Nos. 7,478, 751, 7,210,627, and 7,377,433 to Morley et al. and U.S. patent application Ser. Nos. 11/949,722, 11/935,980 and 12/011,301, the entire content of each is hereby incorporated by reference.

The magnetic key card 104 can be swiped a second time through the card reader 102. Based on the information obtained from the seed card 104, the card reader 102 can generate a second magnetic fingerprint and store it in the second key slot 112-2. The second magnetic fingerprint can be a value indicative of the intrinsic magnetic characteristic of the seed card 104. In several embodiments, the intrinsic magnetic characteristic includes a remanent noise characteristic unique to the magnetic stripe of the seed card 104. While not bound by any particular theory, the remanent noise characteristic is generally repeatable. However, the first and second magnetic fingerprints are very unlikely to be identical due to the random nature of the remanent noise. The computer 106 can also be used to store a unique device identification number within the card reader 102. In several embodiments, the device identification number is provided from an external computing device.

In a number of embodiments, the card reader 102 sends the stored magnetic fingerprints and device identification number of the card reader to the authentication server along a secure communication channel within the network 108. In several embodiments, the network 108 is a proprietary network provided and operated by a manufacturer of the card readers. In other embodiments, the network 108 can be unsecure and the computer 106 and authentication server 110 can provide encryption services for securing the communication of the stored magnetic fingerprints and device identification numbers from hackers.

Figure 2:
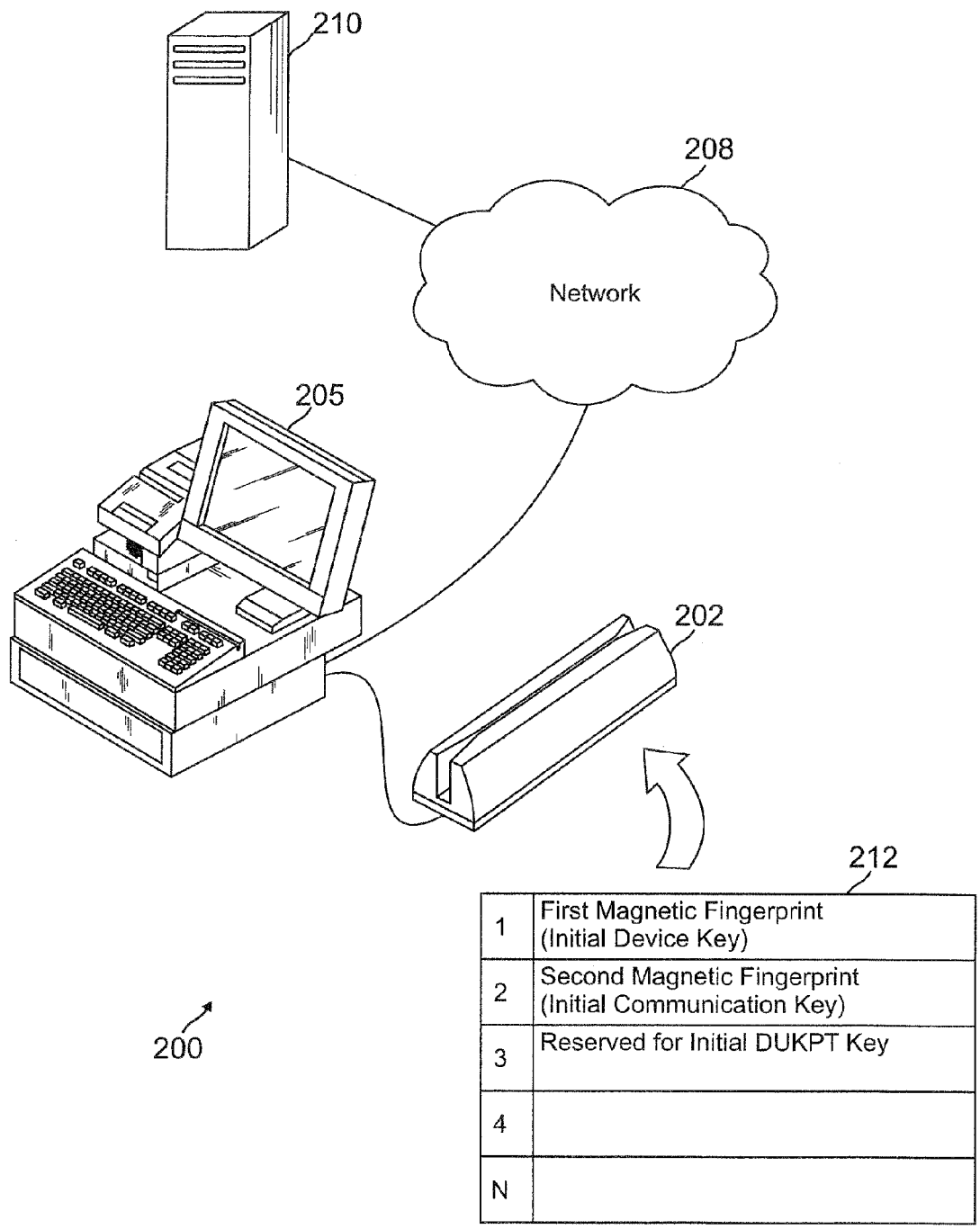
FIG. 2 is a schematic block diagram of a point of sale system, including a card reader and a cash register, for performing device authentication and remote key loading using seeded manufacturing keys in accordance with one embodiment of the present invention.

FIG. 2 is a schematic block diagram of a point of sale system 200, including a card reader 202 and a cash register 205, for performing device authentication and remote key loading using seeded manufacturing keys (212-1, 212-2) in accordance with one embodiment of the present invention. The cash register 205 is coupled to the card reader 202 and an authentication server 210 via a network 208. The point of sale system 200 enables a card user to make a payment or conduct another financial transaction. The card reader 202 includes a non-volatile memory 212, a portion of which can be referred to as a key slot, for storing encryption keys and more particularly, the magnetic fingerprints of a seed card that are used as encryption keys.

In operation, the cash register 205 and/or card reader 202 can enter an authentication mode. In such case, the card reader 202 can encrypt the first magnetic fingerprint and device identification number, using a value generated from the second magnetic fingerprint as the encryption key (e.g., such as a subset of the second magnetic fingerprint), and send the encrypted information to the authentication server 210. The authentication server 210 can receive the encrypted information and decrypt it using a value generated from the stored copy of the second magnetic fingerprint. The authentication server 210 can compare the first and second magnetic fingerprints and generate a score indicative of a degree of correlation between the fingerprints. In one embodiment, the score is a numerical value with a preselected range (e.g., 0 to 100). The authentication server 210 can send the score to the card reader 202. If the score is not greater than a preselected correlation threshold, the card reader 202 can be disabled and/or otherwise treated as an unauthorized device by the cash register 205 and/or the authentication server 210. If the score is greater than a preselected correlation threshold, the authentication server 210 can send a first remote encryption key encrypted, using a value generated from the first magnetic fingerprint as the encryption key (e.g., such as a subset of the first magnetic fingerprint), to the card reader 202. The card reader 202 can receive the information, decrypt the first remote encryption key and store it for subsequent use.

In the embodiment illustrated in FIG. 2, the cash register 205 and card reader 202 are shown as separate devices. In other embodiments, the cash register 205 and card reader 202 form a single integrated device and are operated as a single system. In such case, the single system sends and receives communications from the authentication server.

Figure 3:
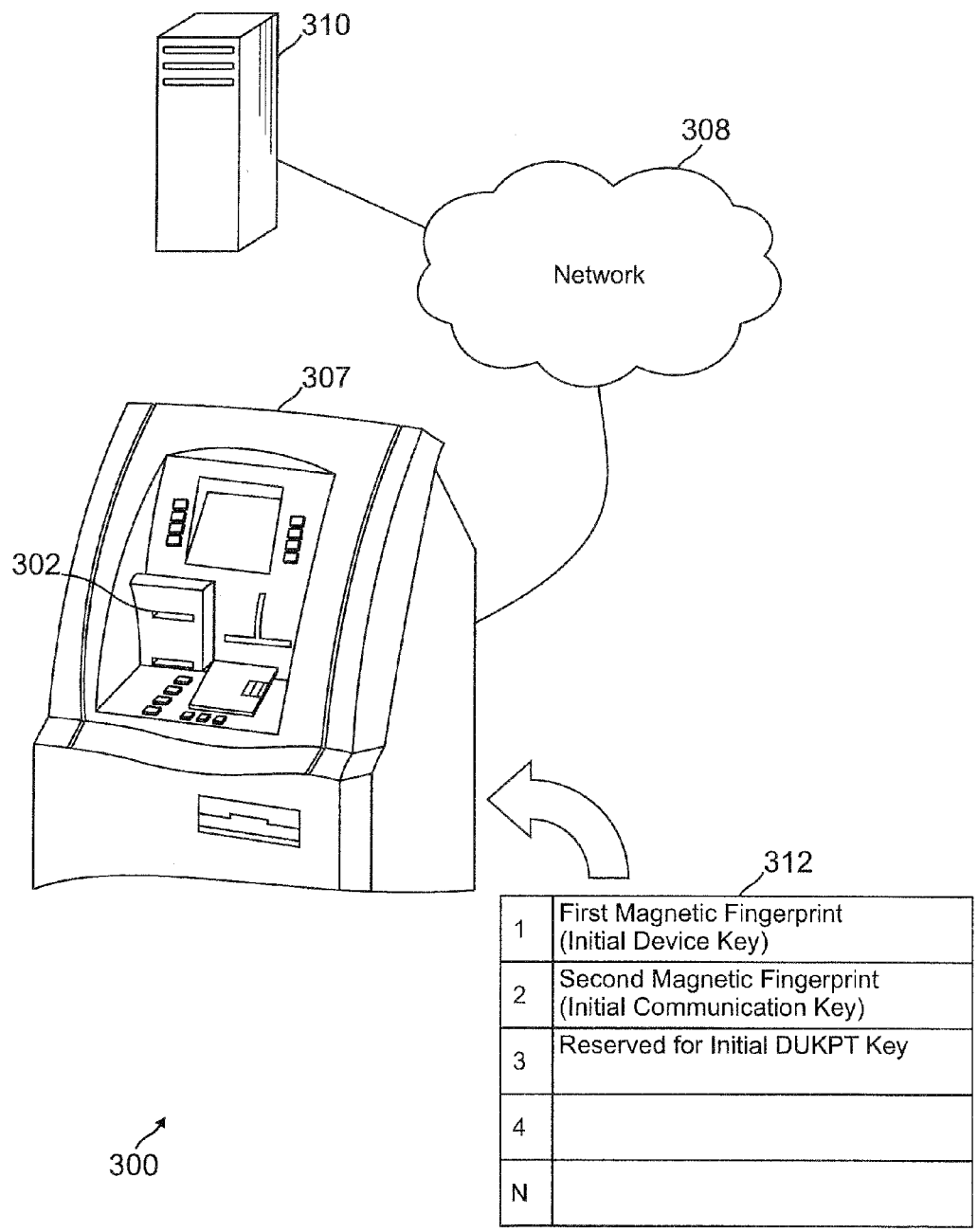
FIG. 3 is a schematic block diagram of an automated teller machine system including an automated teller machine with an integrated card reader for performing device authentication and remote key loading using seeded manufacturing keys in accordance with one embodiment of the present invention.

FIG. 3 is a schematic block diagram of a automated teller machine system 300 including an automated teller machine 307 with an integrated card reader 302 for performing device authentication and remote key loading using seeded manufacturing keys in accordance with one embodiment of the present invention. The ATM 307 is coupled to an authentication server 310 via a network 308. The ATM 307 and card reader 302 enable a card user to perform a number of financial transactions, including, for example, a typical ATM financial transaction such as a withdrawal. The card reader 302 includes a non-volatile memory 312 for storing encryption keys and the magnetic fingerprints of a seed card that can be used as encryption keys. In several embodiments, the ATM 307 and card reader 302 can operate in a manner similar to the cash register and card reader described in FIG. 2.

Figure 4:
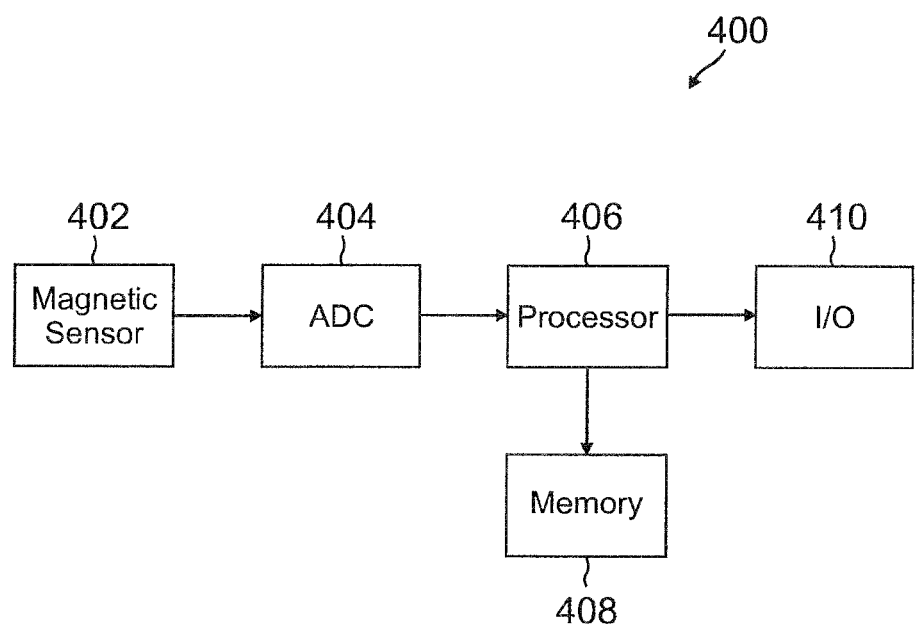
FIG. 4 is a schematic block diagram of a card reader in accordance with one embodiment of the present invention.

FIG. 4 is a schematic block diagram of a card reader 400 in accordance with one embodiment of the present invention. The card reader 400 includes a magnetic sensor 402, an analog to digital converter (ADC) 404, a processor 406, a memory 408, and an input/output (I/O) interface 410. In operation, the magnetic sensor 402, which can also be referred to as a magnetic reading head, can read a magnetic data card swiped through the card reader and generate an analog signal corresponding to the magnetic information read from the magnetic stripe of the data card. The analog signal is received by the ADC 404, converted to a digital signal and provided to the processor 406. The processor 406 can store the digital signal in the memory 408 and generate a magnetic fingerprint based thereon. The processor 406 can also encrypt the magnetic fingerprint with an encryption key stored in the memory if appropriate. The memory 408 can also be used to store a device identification number assigned to the card reader. The processor 406 can send and receive information via the I/O interface 410.

The memory 408 can include both volatile and non-volatile memory. In several embodiments, the memory 408 is secured by various anti-tampering and theft prevention mechanisms. In one such embodiment, the processor 406 and memory 408 are implemented using a secure microcontroller. The card reader 400 can also include additional features such as a tamper resistant housing with tamper detection circuitry. In addition, the card reader 400 can include additional features such as those described in U.S. Pat. No. 7,703,676, the entire content of which is incorporated herein by reference.

Figure 5:
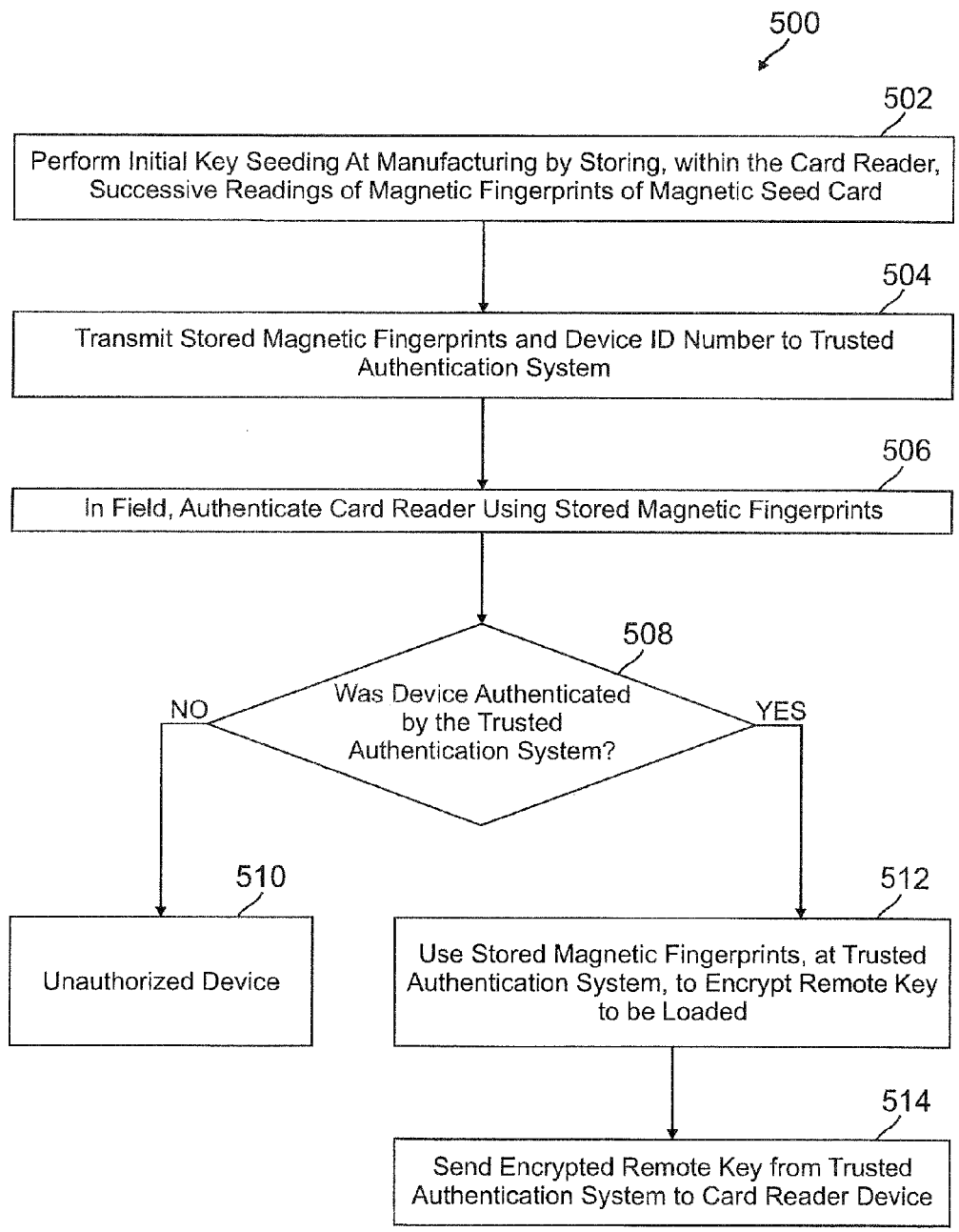
FIG. 5 is a flowchart of an overall process for remotely loading a key for use with a card reader in accordance with one embodiment of the present invention.

FIG. 5 is a flowchart of an overall process 500 for remotely loading a key for use with a card reader in accordance with one embodiment of the present invention. In several embodiments, this process can be performed in conjunction with the systems described above. The process begins by performing (502) initial key seeding at a manufacturing location by storing, within the card reader, successive readings of magnetic fingerprints of a magnetic seed card. The magnetic fingerprints can be values indicative of a intrinsic magnetic characteristic of the seed card. In several embodiments, the card reader receives an analog signal indicative of the magnetic information obtained from a magnetic stripe of the data card. In such case, a magnetic fingerprint may be generated from the analog signal using various processing techniques described in the patents referenced above. The process then transmits (504) one or more of the stored magnetic fingerprints and a stored device identification number to a trusted authentication system/server. Once the card reader is placed in the field, the process can authenticate (506) the card reader device using the stored magnetic fingerprints. In several embodiments, the card reader device sends the stored magnetic fingerprints to the trusted authentication server for storage in a database during the initial seeding.

The process can determine (508) whether the device was authenticated by the trusted authentication server, often based on a score. In one embodiment, the trusted authentication server attempts to decrypt information sent by the card reader/device. However, if the authentication server's stored magnetic fingerprints do not properly correspond those of the card reader/device, then the decryption will be unsuccessful and the device will not be authenticated. If the device was not authenticated, then the process considers the device as being unauthorized (510) and can disable the device and/or otherwise prevent operation thereof. If the device was authenticated, the process can use (512) the stored magnetic fingerprints, at the trusted authentication server, to encrypt a new remote key to be loaded within the card reader. The process can then send (514) the encrypted remote key from the trusted authentication system to the card reader device, thereby having remotely loaded a new key using the seeded magnetic fingerprints as both a seed to generate an encryption key and as a unique device authentication value. In several embodiments, the remotely loaded encryption key is an initial fixed key for a key management system such as derived unique key per transaction (DUKPT). In such case, the initial fixed key can be used to derive a unique key for each transaction.

In one embodiment, the process can perform the sequence of actions in any order. In another embodiment, the process can skip one or more of the actions. In other embodiments, one of more of the actions are performed simultaneously. In some embodiments, additional actions can be performed.

Figure 6:
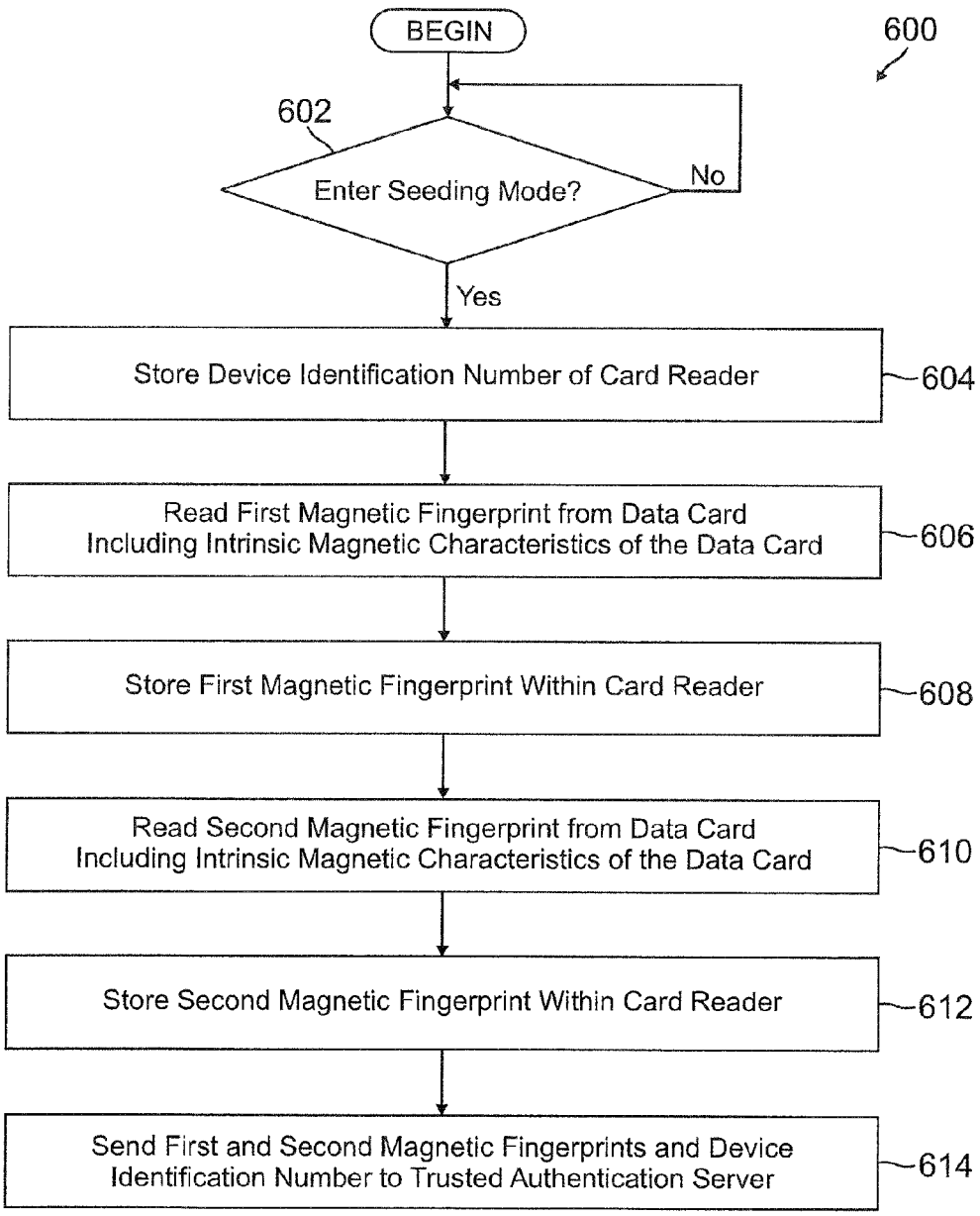
FIG. 6 is a flowchart of a process for performing initial (manufacturing) key seeding in accordance with one embodiment of the present invention.

FIG. 6 is a flowchart of a process 600 for performing initial (manufacturing) key seeding in accordance with one embodiment of the present invention. In several embodiments, the process can be performed by a card reader during a manufacturing process for the reader. In one such case, the process can be performed by any of the card readers described above (e.g., card reader of FIG. 1). The process begins by determining whether an input has been received for entering (602) a seeding mode. If not, the process keeps checking. If the input for entering a seeding mode is received, the process stores (604) a device identification number of the card reader assigned by an external device. In several embodiments, the card reader receives the assigned device identification number from a seeding computer in a manufacturing environment.

The process then reads (606) a first magnetic fingerprint from a seed data card where the fingerprint includes intrinsic magnetic characteristics of the data card. In a number of embodiments, the intrinsic characteristics include a remanent noise characteristic of the magnetic stripe material of the seed data card. In such case, the magnetic fingerprint can be a value representative of the remanent noise characteristic of the data card. The process then stores (608) the first magnetic fingerprint with the card reader. The process then reads (610) a second magnetic fingerprint from the seed data card including intrinsic magnetic characteristics of the data card. In some embodiments, the first and second magnetic fingerprints are read from different seed data cards. The process then stores (612) the second magnetic fingerprint with the card reader. In some embodiments, the first magnetic fingerprint and second magnetic fingerprint are obtained one after another. In other embodiments, the process obtains the first magnetic fingerprint at one stage in a manufacturing process and obtains the second magnetic fingerprint at a final stage in the manufacturing process. After storing the second magnetic fingerprint, the process sends (614) the first and second magnetic fingerprints and device identification number to a trusted authentication server. In processing a number of card readers, the trusted authentication server can populate a database of magnetic fingerprints indexed by the assigned device identification number.

In one embodiment, the process can perform the sequence of actions in any order. In another embodiment, the process can skip one or more of the actions. In other embodiments, one of more of the actions are performed simultaneously. In some embodiments, additional actions can be performed.

Figure 7:
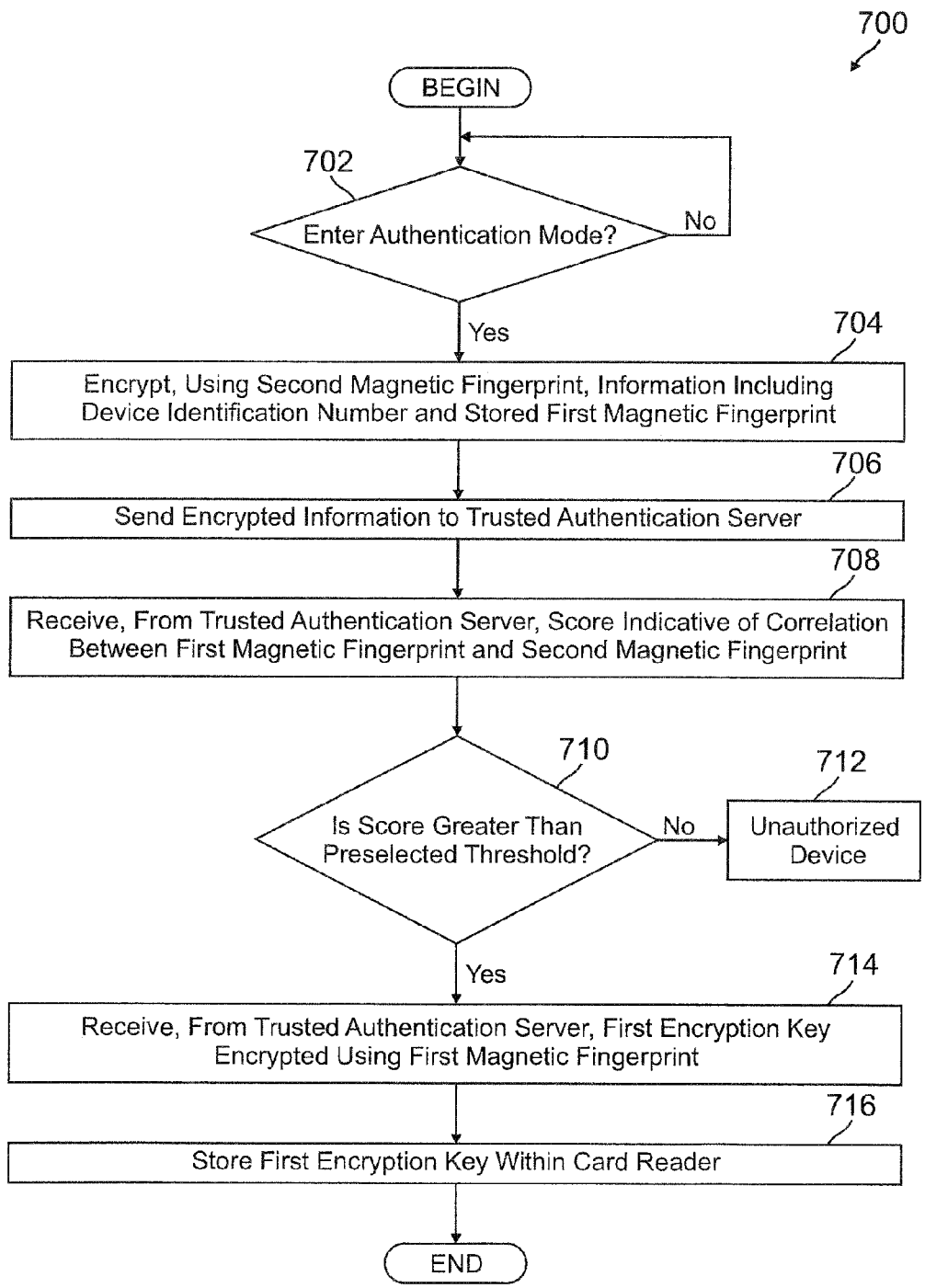
FIG. 7 is a flowchart of a process for performing remote key loading using the manufacturing keys in accordance with one embodiment of the present invention.

FIG. 7 is a flowchart of a process 700 for performing remote key loading using the manufacturing keys in accordance with one embodiment of the present invention. In several embodiments, the process can be performed by a card reader in the field. In one such case, the process can be performed by any of the card readers described above (e.g., card readers of FIG. 2 and FIG. 3). The process begins by determining whether an input has been received for entering (702) an authentication mode. If not, the process keeps checking. If the input for entering a authentication mode is received, the process encrypts (704), using a value generated from the second magnetic fingerprint as an encryption key (e.g., a subset of the second magnetic fingerprint), information including the device authentication number and the stored first magnetic fingerprint. In several embodiments, the first and second magnetic fingerprints are 54 byte values and a subset of the second magnetic fingerprint is used to generate the encryption key for transporting the device authentication number and the stored first magnetic fingerprint. In one embodiment, the subset is a 8 byte, 16 byte or 24 byte value derived from the 54 byte magnetic fingerprint. The process then sends (706) the encrypted information to a trusted authentication server. The trusted authentication server can decrypt the information using the a value generated from the indexed second magnetic fingerprint that it has stored for the device identification number of the transmitting card reader.

The process can then receive (708), from the trusted authentication server, a score indicative of a degree of correlation between the first and second magnetic fingerprints. The process can determine whether (710) the score is greater than a preselected correlation threshold. If it is not, the process considers the card reader device as being unauthorized (712) and can disable the device and/or otherwise prevent operation thereof. If the score is greater than the preselected correlation threshold, the process can receive (714), from the trusted authentication server, a first remote encryption key encrypted using a value generated from the first magnetic fingerprint as the encryption key (e.g., a subset of the first magnetic fingerprint). The process can decrypt the first remote encryption key and store (716) it within the card reader. In several embodiments, the remotely loaded encryption key is an initial fixed key for a DUKPT key management system.

In one embodiment, the process can perform the sequence of actions in any order. In another embodiment, the process can skip one or more of the actions. In other embodiments, one of more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In one embodiment, for example, the processes described herein can be used in conjunction with just a read head rather than a card reader. In other embodiments, the processes described herein can be used in conjunction with other suitable devices.

What is claimed is:

1. A method for remotely loading encryption keys into a card reader system, the method comprising:
storing, at a card reader, a device identification number for identifying the card reader, a first magnetic fingerprint of a data card, and a second magnetic fingerprint of the data card, wherein each of the first and second magnetic fingerprints comprises an intrinsic magnetic characteristic of the data card and was previously obtained from a reading of a magnetic stripe of the data card;
generating a first encryption key derived from the second magnetic fingerprint;
encrypting, using the first encryption key, first information comprising the device identification number and the first magnetic fingerprint;
sending the encrypted first information to an authentication server, wherein the authentication server was previously seeded with the device identification number, the first magnetic fingerprint, and the second magnetic fingerprint;
receiving, from the authentication server, a score indicative of a degree of correlation between the first magnetic fingerprint and the second magnetic fingerprint; and
receiving, when the score is above a preselected threshold, a second encryption key from the authentication server, the second encryption key encrypted using a third encryption key derived from the first magnetic fingerprint.

2. The method of claim 1, wherein the first magnetic fingerprint and the second magnetic fingerprint are obtained from successive readings of information stored in the magnetic stripe of the data card.

3. The method of claim 1, wherein the device identification number is provided to the card reader by an external device.

4. The method of claim 1, wherein the intrinsic magnetic characteristic comprises a remanent noise characteristic of the data card.

5. The method of claim 1, wherein the card reader is a component of a system selected from the group consisting of a point of sale system and an automated teller machine system.

6. The method of claim 1, wherein the encrypting, using the first encryption key derived from the second magnetic fingerprint, the first information comprising the device identification number and the first magnetic fingerprint comprises:
storing, at the authentication server, the first magnetic fingerprint, the second magnetic fingerprint, and the device identification number; and encrypting, using the first encryption key derived from the second magnetic fingerprint, the first information comprising the device identification number and the first magnetic fingerprint.

7. The method of claim 1, further comprising:
storing, when the score is below the preselected threshold, information indicating that the card reader is an unauthorized device.

8. The method of claim 1, further comprising:
attempting, at the authentication server, to decrypt the encrypted first information;
storing, when the attempting to decrypt is not successful, information indicating that the card reader is an unauthorized device.

9. The method of claim 1, wherein the score is a numerical value in a range from 0 and 100.

10. The method of claim 1, wherein the second encryption key is configured for use as a transaction key.

11. The method of claim 10, wherein the transaction key is a base key for derived unique key per transaction (DUKPT).

12. The method of claim 1, wherein the storing, at the card reader, the device identification number for identifying the card reader, the first magnetic fingerprint of the data card, and the second magnetic fingerprint of the data card comprises:
sending, from the card reader, the first and second magnetic fingerprints and the device identification number to the authentication server.

13. The method of claim 1, wherein the storing, at the card reader, the device identification number for identifying the card reader, the first magnetic fingerprint of the data card, and the second magnetic fingerprint of the data card comprises:
receiving an analog signal indicative of the magnetic information obtained from a magnetic stripe of the data card;
generating the first magnetic fingerprint based on the analog signal.

14. The method of claim 1, wherein the first magnetic fingerprint comprises a digital value selected from the group consisting of an 8 byte value, a 16 byte value, a 24 byte value, and a 54 byte value.

15. A system for remotely loading encryption keys, the system comprising:
a card reader system comprising a card reader; and
an authentication server in communication with the card reader system;
the card reader system configured to:
store a device identification number for identifying the card reader, a first magnetic fingerprint of a data card, and a second magnetic fingerprint of the data card, wherein each of the first and second magnetic fingerprints comprises an intrinsic magnetic characteristic of the data card and was previously obtained from a reading of a magnetic stripe of the data card;
generate a first encryption key derived from the second magnetic fingerprint;
encrypt, using the first encryption key, first information comprising the device identification number and the first magnetic fingerprint;
send the encrypted first information to the authentication server, wherein the authentication server was previously seeded with the device identification number, the first magnetic fingerprint, and the second magnetic fingerprint;
receive, from the authentication server, a score indicative of a degree of correlation between the first magnetic fingerprint and the second magnetic fingerprint; and
receive, when the score is above a preselected threshold, a second encryption key from the authentication server, the second encryption key encrypted using a third encryption key derived from the first magnetic fingerprint.

16. The system of claim 15, wherein the authentication server is configured to:
generate the score indicative of a degree of correlation between the first magnetic fingerprint and the second magnetic fingerprint; and
send the score to the card reader system.

17. The system of claim 15, wherein the authentication server is configured to:
attempt to decrypt the encrypted first information;
store, when the attempt to decrypt is not successful, information indicating that the card reader system is an unauthorized device.

18. The system of claim 15, wherein the first magnetic fingerprint and the second magnetic fingerprint are obtained from successive readings of information stored in the magnetic stripe of the data card.

19. The system of claim 15, wherein the device identification number is provided to the card reader by an external device.

20. The system of claim 15, wherein the intrinsic magnetic characteristic comprises a remanent noise characteristic of the data card.

21. The system of claim 15, wherein the card reader is a component of a system selected from the group consisting of a point of sale system and an automated teller machine system.

22. The system of claim 15, wherein the authentication server is configured to:
store the first magnetic fingerprint, the second magnetic fingerprint, and the device identification number; and
encrypt, using the first encryption key derived from the second magnetic fingerprint, the information comprising the device identification number and the first magnetic fingerprint.

23. The system of claim 15, wherein the authentication server is configured to:
store, when the score is below the preselected threshold, information indicating that the card reader is an unauthorized device.

24. The system of claim 15, wherein the score is a numerical value in a range from 0 and 100.

25. The system of claim 15, wherein the second encryption key is configured for use as a transaction key.

26. The system of claim 25, wherein the transaction key is a base key for derived unique key per transaction (DUKPT).

* * * * *